United States Patent [19]

Roper

[11] 4,313,638
[45] Feb. 2, 1982

[54] INFINITELY VARIABLE SEAT RECLINER MECHANISM

[75] Inventor: Daniel W. Roper, Rochester, Mich.

[73] Assignee: Rockwell International Corporation, Pittsburgh, Pa.

[21] Appl. No.: 173,488

[22] Filed: Jul. 30, 1980

[51] Int. Cl.³ ............................................. A47C 1/027
[52] U.S. Cl. .................................... 297/374; 16/297; 16/324; 74/531
[58] Field of Search ............... 297/374, 376, 355, 354; 16/140, 141; 74/531; 188/70 B, 74, 82.1, 82.2, 82.7; 403/92, 95

[56] References Cited

U.S. PATENT DOCUMENTS

| 403,562 | 5/1889 | Stickney | 74/531 |
| 2,409,884 | 10/1946 | Mollenhour | 74/531 X |

FOREIGN PATENT DOCUMENTS

| 1260755 | 4/1961 | France | 297/374 |
| 2350982 | 12/1977 | France | 297/374 |
| 352186 | 9/1937 | Italy | 74/531 |

*Primary Examiner*—William E. Lyddane

[57] ABSTRACT

An infinitely variable seat recliner mechanism is provided for automobile seats. The mechanism has a first arm having a generally V-shaped camming surface thereon. The mechanism has a second arm having a pivot pin rigidly attached thereto. The first arm is mounted on the pivot pin of the second arm to enable relative rotation therebetween. There are two wedge blocks having a generally V-shaped friction surface at one end thereof slidably mounted on and retained in the generally V-shaped camming surface on the first arm. A friction surface is provided on the second arm having a generally V-shaped cross section with an included angle equal to the included angle of the friction surfaces on the wedge blocks and is capable of mating therewith. Each of the wedge blocks is capable of sliding along one leg of the V-shaped surface of the first arm and into locking engagement with the friction surface on the second arm thereby preventing rotation of the second arm relative to the first arm in one direction respectively. A spring is provided to force the wedge blocks into engagement with the friction surface on the second arm. A release mechanism is also provided to move the wedge blocks out of contact with the friction surfaces on the second arm to permit free rotation between the first and second arms.

12 Claims, 2 Drawing Figures

U.S. Patent     Feb. 2, 1982     4,313,638

INFINITELY VARIABLE SEAT RECLINER MECHANISM

BACKGROUND OF THE INVENTION

1. Field of the Invention.

The present invention relates to a mechanism for pivotally locating a vertical seat back with respect to an associated horizontal seat cushion in an adjustable manner. More specifically, the present invention relates to an automobile seat recliner which can be adjusted to locate a seat back in an infinite number of positions.

2. Description of the Prior Art.

Seat recliners are used with vehicle seats to control the angular orientation of a vehicle seat back with respect to an associated horizontal seat cushion. Adjustment of the angular orientation of the back with respect to the cushion affords a vehicle driver or passenger comfort in assuming a position that meets with the seat occupant's size and desired position while seated. Conventionally, recliners have been limited in the number of positions to which the seat back can be oriented with respect to the seat cushion. Also, when utilized with front seats in a vehicle of the "two-door" type, the seat back must be able to pivot forwardly independent of the seat cushion to an easy enter position to allow a person to enter or leave the rear seat behind the front seat.

There have hitherto been many examples of infinitely variable seat back adjusters. Many of these mechanisms have difficulty in producing a locking force which is great enough to withstand the impact loadings on the seat back required for occupant safety. In addition, many of these reclining mechanisms are very complicated and, consequently, expensive to mass produce.

An example of an infinitely variable seat back adjuster is that shown in U.S. Pat. No. 4,070,058, issued Jan. 24, 1978 to Anthony A. Muehling. This patent discloses a seat reclining mechanism mounted on the seat cushion and the seat back and contains a pair of cam members pivoting about a axis within a housing. These cam members engage a cam surface on one end and a locking surface on the other end so that rotation is resisted by the forcing of the cam member into locking engagement with the locking surface by attempted movement of the other cam surface. A mechanism of this type does not produce the positive locking forces inherent in the present invention. Also, a large number of parts are required, thereby, making the seat reclining mechanism expensive to produce.

U.S. Pat. No. 3,423,785, issued Jan. 28, 1969 to J. Pickles discloses a position control mechanism which uses a cyclic gearing to produce substantial rotation of a friction drum upon limited rotation between the seat back and the seat cushion. The friction drum is bound with a spring coil which acts as a friction brake and, thereby, locks the seat back and seat cushion from relative rotation. Again, the locking forces developed by this scheme are far less than those developed by the seat reclining mechanism of the present invention. A similar seal reclining mechanism is shown in U.S. Pat. No. 3,508,294 which issued on Apr. 28, 1970 to the same inventor.

U.S. Pat. No. 3,315,298, issued Apr. 25, 1967 to W. Strien et al. discloses several embodiments each of which employ a helical camming surface on a rotatable plate to position an element fixedly attached to the seat back. Movement of the seat back is resisted by the element being moved generally perpendicular to the camming surface. Since only a small inclined angle exists between the element and the camming surface, the camming surface will not rotate because a friction force applied to the camming surface plate has a mechanical advantage due to the small angle. The forces produced by this scheme are still relatively less than the forces developed by the mechanism of the present invention. Furthermore, the helical surfaces are expensive to manufacture and not easily suitable for mass production.

U.S. Pat. No. 3,237,987, issued Mar. 1, 1966 to J. James discloses a locking mechanism which utilizes two sets of rollers each of which may be wedged between a cylindrical surface attached to seat back and a fixed inclined surface. Any movement of the seat back rearward or forward causes one or the other set of rollers to engage the inclined surface which futher wedges the rollers against the cylindrical surface. The frictional forces thus developed keep the seat back from moving. Movement of a release mechanism in one direction will allow the seat to be moved in the opposite direction only since only one set of rollers can be displaced from the wedging surfaces at a time. It has been found that the mechanism of the present invention is far cheaper to mass produce than that disclosed in U.S. Pat. No. 3,237,987.

Other examples of infinitely variable seat reclining mechanisms are disclosed in U.S. Pat. Nos. 2,112,265 and 3,195,952.

The seat reclining mechanism of the present invention utilizes a self-energizing double wedge arrangement to effect locking. The inventor has used a similar idea in his limited slip differentials disclosed in U.S. Pat. Nos. 3,572,165 issued Mar. 23, 1971 and 3,762,241 issued Oct. 2, 1973. These patents deal with a clutch arrangement which would not suggest their use in a seat reclining mechanism.

DESCRIPTION OF THE PREFERRED EMBODIMENT

Figure 1:
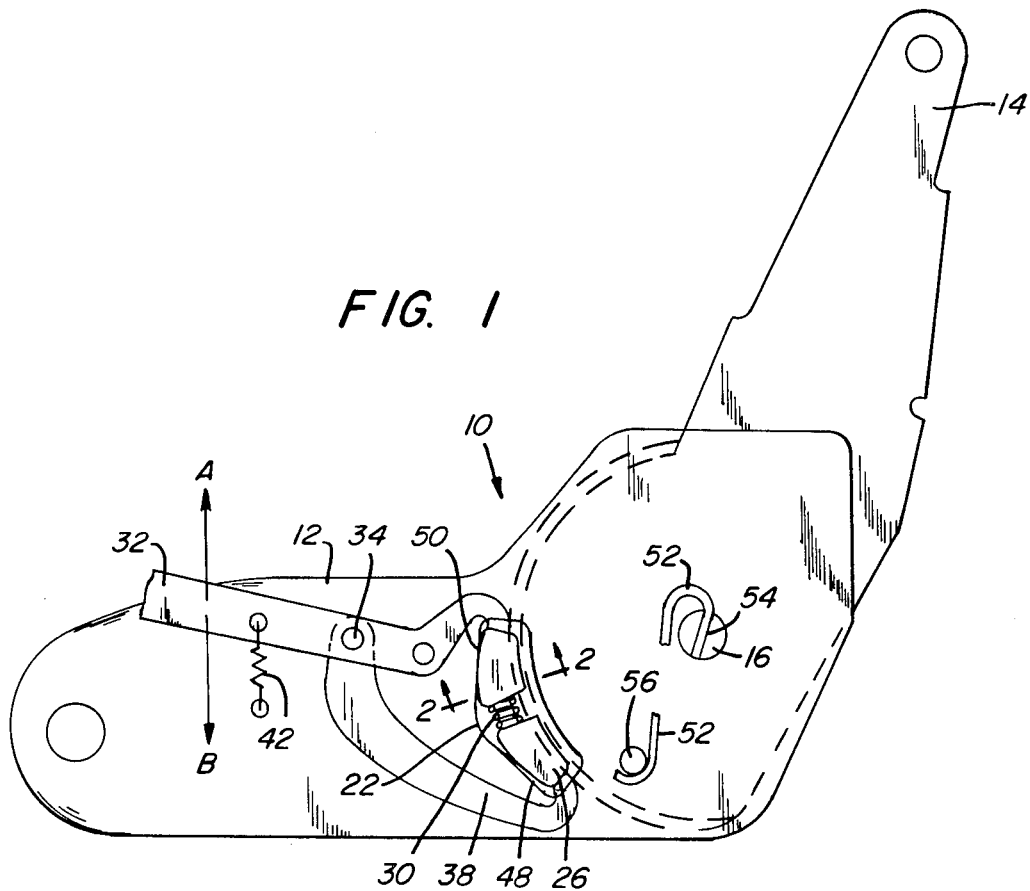
FIG. 1 is a side view of the seat reclining mechanism of the present invention.
Figure 2:
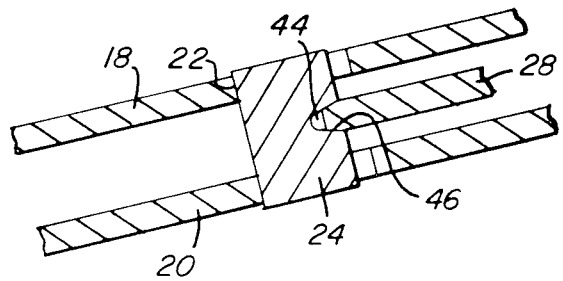
FIG. 2 is a sectional view taken along the Lines 2—2 of FIG. 1.

With reference to FIG. 1, there is shown a seat reclining mechanism generally denoted as 10. The seat reclining mechanism 10 has a first arm 12 which is interconnected to a second arm 14 about a pivot pin 16.

In the preferred embodiment the arm 12 is composed of two plates 18 and 20. The two plates 18 and 20 are rigidly secured together and are in side by side contact at the end arm 12 which is attached to the seat cushion. The plates 18 and 20 are bifurcated at the end of arm 12 which engages arm 14. The plates 18 and 20 have a V-shaped camming surface 22 cut therein to permit the mounting of wedge blocks 24 and 26 thereon.

In the preferred embodiment, the arm 14 has a circular portion 28 which is capable of engaging wedge blocks 24 and 26. The V-shaped surface 22 is oriented so that movement of the wedge blocks 24 and 26 away from one another along the legs 48, 50 of surface 22 causes increased wedging engagement between the wedge blocks 24 and 26 and the circular portion 28 of arm 14. This wedging engagement, which will be described in greater detail below, effectively locks arms 12 and 14 from relative rotation therebetween. A spring 30 is provided to insure that the wedge blocks 24 and 26 are normally in contact with the circular portion 28 of arm 14.

A means is provided to move the wedge blocks 24, 26 toward one another against spring 30 to release the arms 12 and 14 thereby permitting relative rotation therebetween. In the preferred embodiment, the means is a lever 32 which is mounted within plates 18 and 20 of arm 12 on a pivot pin 34. The lever 32 has two arms 38 and 40. Arm 38 is rotatably mounted on arm 32 by pivot pin 36. Pivot pin 36 is not rigidly fastened to the side walls 18 and 20 of arm 12 as is pivot pin 34. Motion of lever 32 in the direction marked A of FIG. 1 causes arms 38 and 40 to impinge on wedge blocks 24 and 26 forcing them together against spring 30. The movement of wedge blocks 24 and 26 toward one another unlocks the mechanism. A spring 42 is provided to act between arm 12 and lever 32 so that the arms 38 and 40 are normally disengaged from the wedge blocks 24 and 26.

In the preferred embodiment, each of wedge blocks 24 and 26 has a circular grooved section 44 at the end thereof which engages circular portion 28 of arm 14. The preferred groove has a cross section which is V-shaped and is curved to match the curvature of the circular portion 28. Thus, the radius of the curved V-shaped groove in either wedge block 24 or 26 is centered at the pivot pin 16. The circular portion 28 of arm 14 has a friction surface 46 which has a generally V-shaped cross section having an included angle the same as the included angle in the groove 44. As the wedge blocks 24 and 26 move up the V-shaped surface 22 on arm 12, the groove 44 and the friction surface 46 are forced into tight frictional engagement thereby preventing relative motion between arms 12 and 14.

It has been found that if the surfaces of wedge blocks 24 and 26 which contact the V-shaped surface 22 are slightly crowned the wedge blocks can orient themselves to sufficiently allow tolerances of at least plus or minus 1 degree on cam surface 2. Without this feature, the tighter tolerance requirements on the angle of V-shaped surface 22 will make the mechanism more costly to produce.

The locking forces developed by the seat mechanism of the present design are proportional to the relative forces applied to arms 12 and 14. In other words, the wedging forces between the wedge blocks 24 and 26 and the friction surface 28 is proportional to the forces trying to move the seat back forward or rearward. The forces which tend to move the arm 14 toward the arm 12 would create high wedging forces between the circular portion 28 and the wedge block 26. These forces between the arms 12 and 14 would tend to move wedge block 26 up leg 48 of the V-shaped surface 22. Since leg 48 converges toward the circular portion 28, the wedging forces increase as the V-shaped edge 46 is forced into tighter engagement with the groove 44 of wedge block 26. Similarly, forces tending to move arm 14 toward the right in FIG. 1 or away from arm 12 would move wedge block 24 along leg 50 of V-shaped camming surface 22 causing the same greater wedging forces to develop. Therefore, it can be seen that each of the wedge blocks 24 and 26 prevent relative motion between arms 12 and 14 in one direction only.

The relationship between the included angles of groove 44 and friction surface 46 of circular portion 28, the included angle of the V-shaped camming surface 22 of arm 12 and the coefficient of friction between groove 44 on the wedge blocks and friction surface 46 on circular portion 28 must be correctly specified in order to insure that the wedge blocks will be self-energizing. By self-energizing it is meant that the wedge blocks will move from relatively light contact or engagement with the circular portion 28 the respective legs 48 and 50 of V-shaped surface 22 to tight locking engagement on slight movement of arm 14 with respect to arm 12. It has been found that if the wedge blocks are not self-energizing it would require tight contact between the grooved surface 44 and the friction surface 46 to insure movement of the wedge blocks 26, 28 along the camming surface 22 upon slight movement of arm 14 with respect to arm 12. Consequently, the forces required to move wedge blocks 24 and 26 toward one another and out of locking engagement with the circular portion 28 would be too high to permit easy release of the seat back utlizing a simple release mechanism as described above.

If the angle of the V-groove 44 on locking pawls 24 and 26 and the angle of the friction surface 44 is called theta and 90 minus ½ the included angle of camming surface 22 on arm 12 is called alpha, then the adjusting mechanism will be self-energizing when the following relationship exists:

$$\tan \alpha \sin (\theta/2) < \mu$$

Where $\mu$ is the coefficient of friction between the V-shaped groove 44 and the friction surface 46 of arm 14.

The mechanism will release without binding when the following relationship exists:

$$\tan \alpha > \mu$$

and $$\tan (\theta/2) > \mu$$

If the values of theta are 24 degrees and alpha are 12 degrees, then this device will operate properly over a coefficient of friction range of 0.04 to 0.2. If the material chosen for the groove 44 and the friction surface 46 is steel, then the coefficient of friction range stated above will apply over the life of the mechanism since the coefficient of friction between two steel surfaces falls within the stated range whether it is well lubricated or poorly lubricated. The above angles are chosen so the angle of the taper in the groove 44 will not be a locking angle and since the only force acting in the direction to engage the grooved surfaces is the engaging spring force of spring 30 the release force will never be greater than that spring force. This permits easy release using the mechanism.

In the preferred embodiment, arm 12 is attached to the seat cushion frame (not shown) and arm 14 is attached to the seat back frame (not shown). The pivot pin 16 is rigidly fixed to arm 14 so that one end of a spring 52 may be attached thereto. The other end of spring 52 is attached to arm 12 on pin 56 so that arm 14 is biased toward arm 12. In the preferred embodiment, a slot 54 is cut in pivot pin 16 to receive the first end of spring 52. Biasing arm 14 toward arm 12 enables easy entry to the rear seat of a two door car by forcing the seat back forward. The spring 52 also provides resistance for easy positioning of the seat back by the occupant.

Looking at FIG. 1, the normal operating procedure of the seat reclining mechanism of the present invention is as follows. The occupant of the seat would pull lever 32 in the A direction thereby forcing locking pawls 24 and 26 toward one another and out of engagement with friction surface 46. This action would unlock the mechanism and permit arm 14 to rotate either rearward or forward with relation to arm 12. The occupant then positions the seat back at the desired position, which could be infinitely varied, before releasing lever 32. Upon releasing lever 32, the spring 42 would pull the arms 38 and 40 out of engagement with the wedge blocks 24 and 26 so that spring 30 forces wedge blocks 24 and 26 into contact with friction surface 46 of arm 14.

As can be seen from the above description, the infinitely variable seat reclining mechanism may be fabricated from stampings with reasonable stresses and tolerances, therefore, could be cheaply mass produced. If material for the friction surfaces 44 and 46 other than steel is used, the angles of alpha and theta would vary to maintain the above stated relationships depending upon the coefficient of friction involved.

While it will be apparent that the invention herein disclosed is well calculated to achieve the benefits and advantages as hereinabove set forth, it will be appreciated that the invention is susceptible to modification, variation and change without departing from the spirit thereof.

I claim:

1. An infinitely adjustable hinge comprising:
a first arm having a camming surface thereon; a second arm;
a pivot pin extending through and retained between said first and said second arm;
two wedge blocks having a generally V-shaped friction surface at one end thereof slidably mounted and retained on said camming surface of said first arm;
a friction surface on said second arm, having a cross section capable of mating with said friction surface on said wedge block;
said wedge blocks capable of sliding along said camming surface and into locking engagement with said friction surface on said second arm whereby one of said wedge blocks prevents said second arm from rotating with respect to said first arm in one direction and the other of said wedge blocks prevents said second arm from rotating in the opposite direction;
means for biasing said wedge blocks into engagement with said friction surface on said second arm; and
means for moving said wedge blocks out of contact with said friction surface on said second arm to permit free rotation of said second arm relative to said first arm about said pivot pin.

2. An adjustable hinge as set forth in claim 1, wherein said friction surface on said second arm and said friction surface on said wedge blocks are curved.

3. An adjustable hinge as set forth in claim 1, wherein said camming surface forms an oblique angle with respect to said second arm.

4. An adjustable hinge as set forth in claim 3, wherein one of said wedge blocks is slidably engaged with one leg of said oblique camming surface and the other of said wedge blocks is slidably engaged with said other leg of said camming surface.

5. An adjustable hinge as set forth in claim 1, wherein said V-shaped surface on said wedge block is a groove.

6. An infinitely adjustable seat reclining mechanism comprising:
a first arm attached to the seat cushion frame having an oblique camming surface thereon;
a second arm attached to the seat back frame;
a pivot pin extending through and retained between said first and said second arm;
two wedge blocks having a V-shaped friction surface at one end thereof mounted on a generally V-shaped surface integral with said first arm;
a tapered surface on said second arm, having an angular taper equal to the included angle of said groove in said wedge blocks; and
each of said wedge blocks capable of sliding along one leg respectively of said camming surface on said first arm and into locking engagement with said friction surface on said second arm whereby one of said wedge blocks prevents relative motion of said first and second arms in one direction and the other of said wedge blocks prevents relative motion of said first and second arms in the opposite direction;
means for biasing said wedge blocks into engagement with said second arm; and p1 means for moving said wedge blocks out of engagement with said second arm to permit free rotation of said second arm relative to said first arm about said pivot pin.

7. An infinitely adjustable seat recliner as set forth in claim 6, wherein said friction surface on said wedge block is a groove having a generally V-shaped cross section and said friction surface on said second arm has a V-shaped edge with a cross section substantially the same as said groove on said wedge block.

8. An infinitely adjustable hinge as set forth in claim 7, wherein the relationship between the angles of said groove on said wedge block, said friction surface on said second arm and said camming surface on said first arm cause said locking force to increase as the force between said first and second arms increase.

9. An infinitely adjustable hinge as set forth in claim 6 wherein the relationship between the included angle of said camming surface integral with said first arm and the included angle of said groove in said wedge blocks and said friction surface on said second arm is such that only light contact between said wedge blocks and said friction surface on said second arm will cause one of said wedge blocks to move along said generally V-shaped surface and into locking engagement with said friction surface upon movement of said second arm relative to said first arm in one direction and the other of said wedge blocks to move into locking engagement upon movement of said second arm in the other direction.

10. An adjustable positioner as set forth in claim 6, wherein the included angle of said V-shaped edge on said second arm and the included angle of said groove in said wedge block is theta and where 90 degrees minus one-half of the included angle of said camming surface of said first arm is alpha, where the tangent alpha multiplied by the sine of one-half theta is less than the coefficient of friction between the wedge block and said V-shaped edge of said second arm, the tangent of alpha is greater than said coefficient of friction and the tangent of one-half theta is also greater than said coefficient of friction.

11. An adjustable positioner as set forth in claim 10, wherein theta is 12 degrees, alpha is 24 degrees and the coefficient of friction is in the range of 0.04 to 2.

12. An infinitely adjustable hinge as set forth in claim 6 wherein said pivot pin is rigidly mounted to said second arm, and further including a spring having one end mounted in a slot in said pivot pin and having a second end engaging said first arm to bias said second arm towards said first arm.

* * * * *